United States Patent [19]

Irimajiri et al.

[11] Patent Number: 4,623,870

[45] Date of Patent: Nov. 18, 1986

[54] VEHICLE DISPLAY DEVICE

[75] Inventors: Shoichiro Irimajiri; Yutaka Kosuge, both of Saitama; Shigehira Nakamura, Tokyo, all of Japan

[73] Assignee: Honda Giken Kogyo Kabushiki Kaisha, Tokyo, Japan

[21] Appl. No.: 430,303

[22] Filed: Sep. 30, 1982

[30] Foreign Application Priority Data

Oct. 9, 1981 [JP] Japan ............................ 56-160307

[51] Int. Cl.⁴ ............................................ B60Q 1/00

[52] U.S. Cl. ............................ 340/52 F; 340/52 R; 340/752

[58] Field of Search .................. 340/52 F, 52 R, 715, 340/752, 753, 754; 73/117.3

[56] References Cited

U.S. PATENT DOCUMENTS

| | | | |
|---|---|---|---|
| 4,196,413 | 4/1980 | Sowa | 340/52 F |
| 4,199,747 | 4/1980 | Miller et al. | 340/74 |
| 4,210,908 | 7/1980 | Sakakibara | 340/754 |
| 4,332,162 | 6/1982 | Garthe | 73/117.3 |

FOREIGN PATENT DOCUMENTS

| | | | |
|---|---|---|---|
| 2934839 | 3/1981 | Fed. Rep. of Germany | 73/117.3 |

*Primary Examiner*—John W. Caldwell, Sr.
*Assistant Examiner*—Tyrone Queen
*Attorney, Agent, or Firm*—Sughrue, Mion, Zinn, Macpeak, and Seas

[57] ABSTRACT

A display system for a vehicle utilizing two vehicle operating parameters as input signals on axes of a different direction on a display surface. The position on the display surface designated by the two signals is displayed.

4 Claims, 7 Drawing Figures

VEHICLE DISPLAY DEVICE

BACKGROUND OF THE INVENTION

This invention relates to a display device for a motor vehicle for displaying various conditions. Conventional devices to detect various conditions of, for example, a motor vehicle such as speedometer, tachometer, etc. display a condition of the vehicle according to a signal indicating a single condition of the vehicle (vehicle signal), respectively. Each sensor is coupled to one display. The displays are not interrelated to each other. Moreover, with limited display area on a motor vehicle dashboard, a large number of individual displays is difficult to arrange and properly organize for user efficiency.

SUMMARY OF THE INVENTION

This invention eliminates the drawbacks of prior art devices and makes it possible to offer more complicated displays. The invention is characterized in that two vehicle signals are used as input signals on axes of different directions on a display surface and the position designated by the plurality of vehicle signals is displayed on the display surface.

The embodiments of this invention will be described below with reference to the accompanying drawings.

BRIEF DESCRIPTION OF THE PREFERRED EMBODIMENTS

Figure 1:
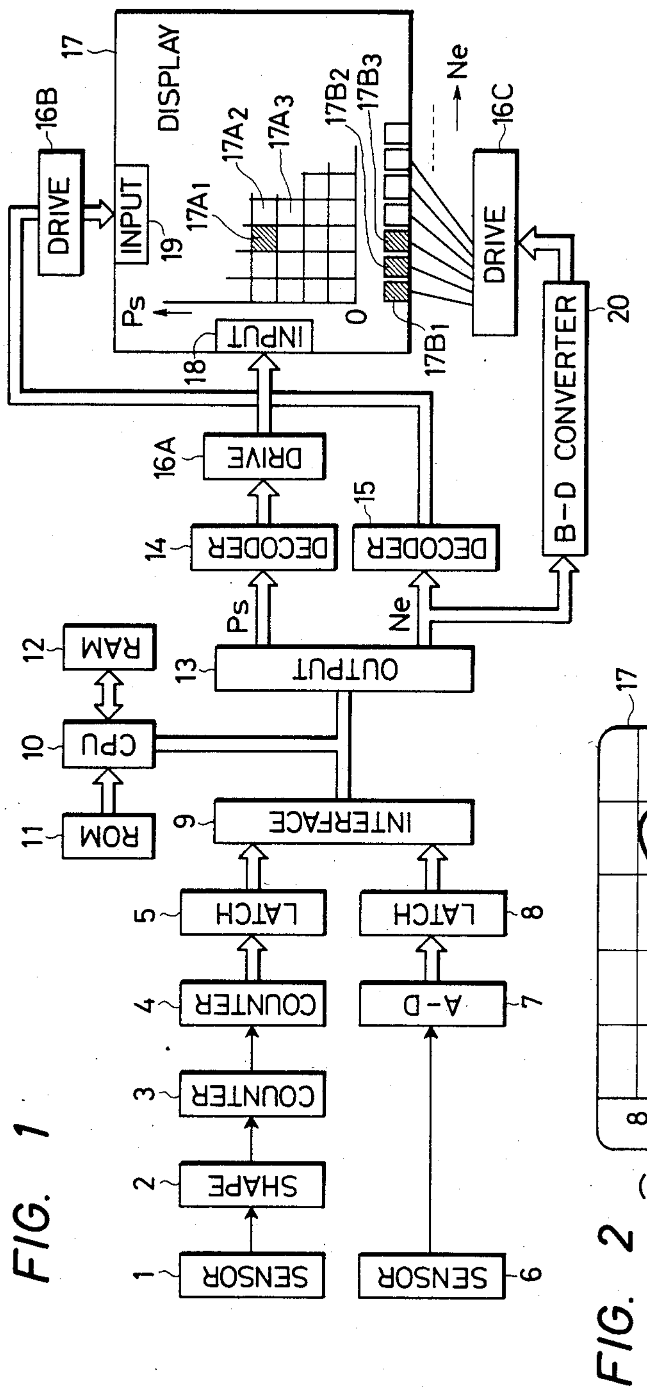
FIG. 1 is a block diagram showing a first embodiment according to this invention.

FIG. 1 is a block diagram showing a display device for the engine speed (Ne)-power (Ps) characteristics using throttle opening ($\theta$th) as parameter. In FIG. 1, the numeral 1 represents an engine speed sensor utilizing, for example, the primary current of an ignition coil whose output is connected with a first counter 3 through a shaping circuit 2. The first counter 3 generates one output pulse when it has counted a predetermined number of input pulses. The output pulses are counted by a second counter 4. A latch 5 latches the parallel signals or the values counted by the counter 4. The output of a throttle opening sensor 6 is latched by a second latch 8 after being converted to digital signals in an A-D converter 7. An input interface 9 connects latches 5 and 8 to a CPU 10 of a computer. Numeral 11 represents a ROM having stored therein values of engine power measured by a power measuring grid and corresponding to engine speed and throttle opening. Numeral 12 represents a RAM. These computer elements are well known microprocessors elements.

An output interface 13 connects the CPU 10 to decoders 14 and 15. The decoder 14 decodes the digital signals for engine power and is connected to the input terminals 18 on a display device 17 for signals in the Y-axis through a drive circuit 16A. The decoder 15 decodes the digital signals for engine speed and is connected with the input terminals 19 on the display device 17 for signals in the X-axis via a drive circuit 16B.

The display device 17, for example, a liquid crystal display, comprises a plurality of strips of upper electrodes arranged laterally in parallel and a plurality of strips of lower electrodes arranged longitudinally perpendicular to and crossing said upper electrodes. A plurality of lower electrodes are connected with a plurality of input terminals 18 for signals in the direction of Y-axis, respectively, and a plurality of upper electrodes being connected with a plurality of input terminals 19 for signals in the X-axis direction, respectively. In FIG. 1, the crossing portions 17A1, 17A2, 17A3, . . . of the upper electrodes and lower electrodes form a display segment, respectively.

If the signals outputted from the drivers 16A and 16B (AC voltages) are applied to the upper electrode and lower electrode forming a crossing portion 17A1, the display segment changes in color for purposes of display. In addition, the display device 17 is provided with a linear display portion for indicating engine speed and comprises a plurality of display segments (17B1), 17B2), . . . . The electrodes forming the display segments (17B1), (17B2), . . . are connected with the input side of the decoder 15 through a drive circuit 16C via a binary-decimal transducer 20.

Figure 2:
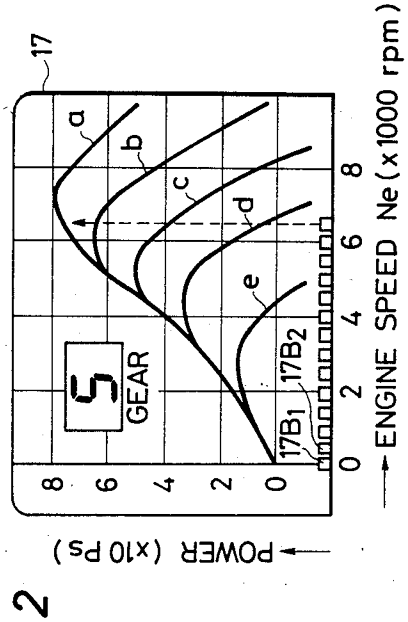
FIG. 2 illustrates the display surface of the display device as shown in FIG. 1.

Referring now to FIG. 2, the Y-axis on the display surface of the display device 17 indicates engine power Ps, and the X-axis engine speed Ne. The characteristic curves between engine speed and power consumption as a function of the throttle opening, (the following ratios of full open: 4/5, 3/5, 2/5, and 1/5) are shown as curves a through e, and are positioned directly on the display surface or on a transparent film to be placed on the display surface. The particular gear in use is also displayed as shown. Next, the operation of the display system will be described.

In running a vehicle, the signals for engine speed as vehicle signals are outputted from the engine speed sensor 1, and are shaped and counted by the first counter 3. This counter outputs one pulse when a given engine speed, for example, the engine speed corresponding to one display segment on the display device 17 is counted. The second counter 4 counts these output pulses and outputs the counted values as parallel signals which are latched in the latch 5. On the other hand, the signals for throttle opening are outputted from the throttle opening sensor 6, converted to digital signals in A-D converter 7, and are latched in the latch 8. The engine speed signal and throttle opening signal serve as address signals and the stored power data corresponding to the address signals are read out from the ROM 11 through the CPU 10. These power signals are used as inputs to the input terminals 18 for signals in the Y-axis on the display device 17. They are applied to the lower electrodes of the sequence corresponding to the power values, respectively.

On the other hand, the engine speed signals generated in the latch 5 are inputted to the input terminals 19 for signals in the X-axis on the display device 17 through the input interface 9, CPU 10, decoder 15, and the drive circuit 16B. They are applied to the upper electrodes of the sequence corresponding to the engine speed values, respectively. Thus, one display segment at the crossing portion of the upper and lower electrodes on the display device 17, that is, one display segment designated by an engine speed and engine power (marked with an arrow), changes color to display the position as shown in FIG. 2. By comparing this display with the characteristic curves a through e, using the throttle opening as a parameter, the present condition of vehicle, that is, the fact that the throttle opening is between full open and 4/5 may be easily ascertained together with corresponding engine speed and power.

Furthermore, the characteristic curves may be omitted, or they may be substituted by discrete data points. Although throttle opening is used as the vehicle signal in this embodiment, intake pressure or intake air rate may be utilized as the operative vehicle signal.

Figure 3:
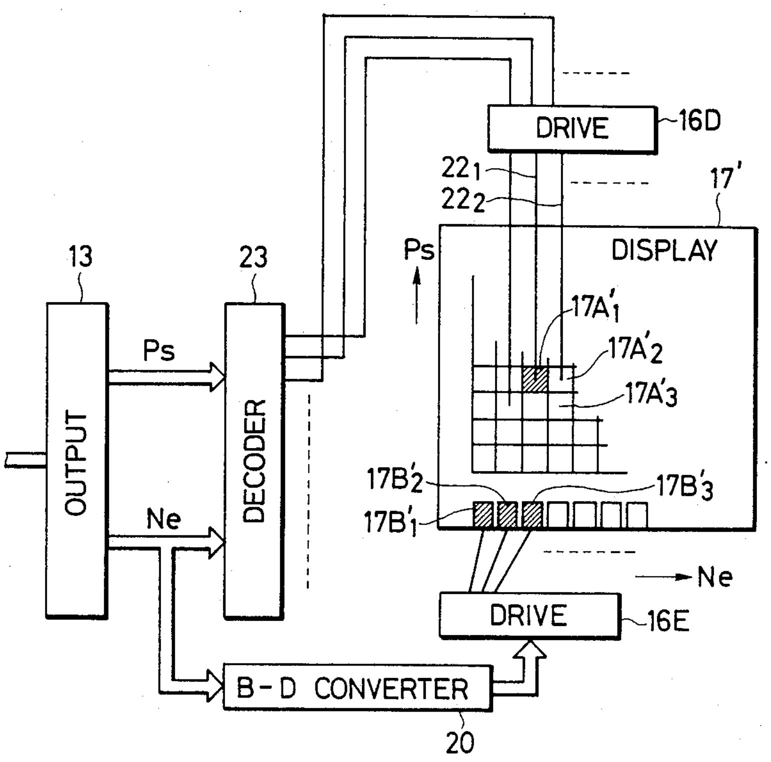
FIG. 3 is a block diagram illustrating a second embodiment according to this invention.

FIG. 3 is a block diagram showing a portion of a second embodiment according to this invention. In FIG. 3, the display device 17' is a liquid crystal display comprising display segments 17'A1, 17'A2, . . . at least one electrode formed of an independent segment, respectively. In addition, a linear display portion is provided comprising a plurality of display segments 17'B1, 17'B2, . . . to indicate engine speed. Each display segment 17'A1, 17'A2, . . . on the display device 17' is connected with input wires $22_1$, $22_2$, . . . , respectively. The input wires $22_1$, $22_2$, . . . are connected with a decoder 23 through a drive circuit 16D. The decoder 23 decodes together the power signals Ps and engine speed signals Ne being outputted from the output interface 13 and selects one corresponding display segment (17'A). The linear display portion 17'B1, 17'B2, . . . is connected with the input side of the decoder 23 through a drive circuit 16E and a binary-decimal converter 20 as in the case with the first embodiment. The inputs to the output interface 13 are the same as in the first embodiment. The description of the operation will be omitted since it is fundamentally the same as that of the first embodiment.

Figure 4:
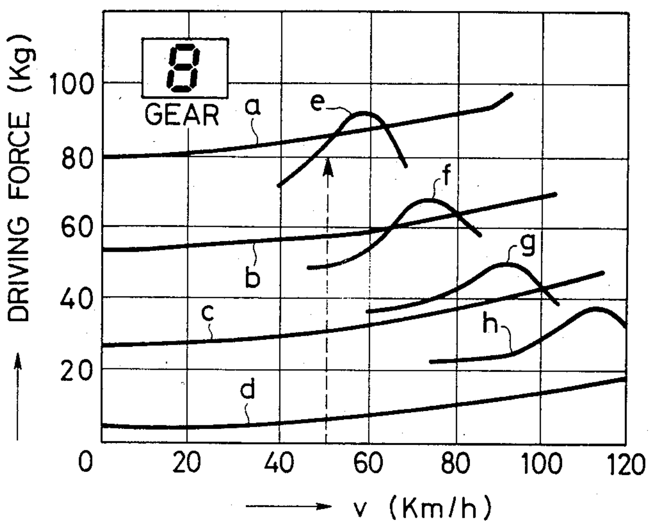
FIGS. 4 to 7 illustrate the display surface of the display device of other embodiments according to this invention.

FIG. 4 is an illustration showing the display of a display device in the case where this invention is applied to the display of the driving speed in relation to driving force (power) characteristics using transmission gear and running resistance as parameters. The driving speed V is obtained from a speed sensor and the driving force is obtained from the ROM 11 in accordance with the speed and transmission gear.

The characteristic curves a through d indicate the speed v. driving force characteristics for a running resistance of 30%, 20%, 10%, or 0%, respectively. The characteristic curves e through h indicate the speed-driving force characteristics for second-gear, third-gear, fourth-gear, or fifth-gear, respectively, and for full open throttle. These characteristic curves are drawn directly on the display surface or on a transparent film to be placed on the display surface.

In this embodiment, the values of driving force to be determined by speed V and transmission gear are stored in the ROM 11 of the computer, and values of driving force are read out from the ROM 11 by address signals of speed signal obtained from a speed sensor and speed change signal corresponding to the position of the transmission gear. The driving force signals are employed as inputs to the lower electrodes through the input terminal for signals in the direction of the Y-axis on the display device. Speed signals are inputted to the upper electrodes through the input terminal for signals in the X-axis on the display device. Then, the position on the display surface designated by 2 vechicle signals, that is, speed signals and driving force signal, change the color of the display, respectively, as, for example, the position marked with an arrow in FIG. 4.

Thus, by comparing the positions with the characteristic curves a through d and e through h, the immediate condition of vehicle, that is, for the position marked with an arrow, a running resistance of +20%, in second gear, and a throttle opening somewhat less than full open can be easily found together with speed and driving force. In this embodiment, the characteristics of a car having manual speed change gears are displayed.

Figure 5:
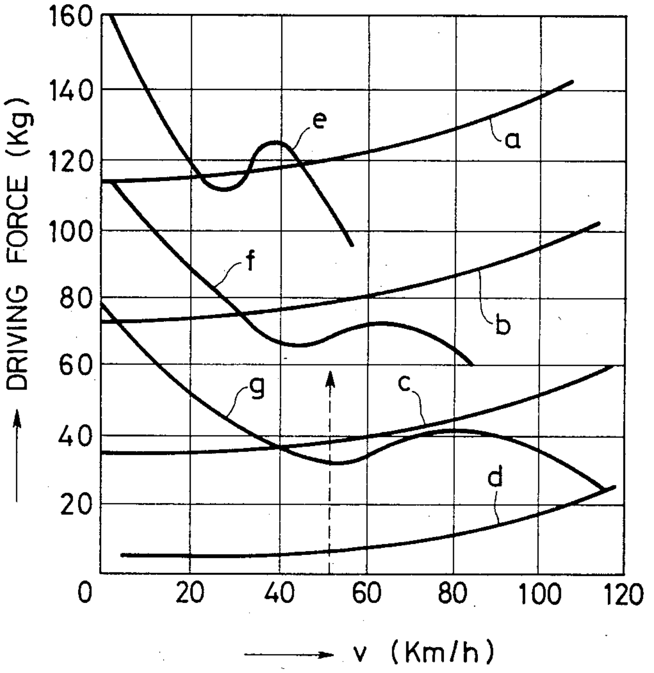

Corresponding characteristics curves for a car having a hydraulic torque converter are shown in FIG. 5. The characteristic curves a through d on the display surface in FIG. 5 are the same as a through d in FIG. 4. Curves e through g represent the speed-driving force characteristics for the first, second, and third transmission gears, respectively. The display (the position marked with an arrow) of the running condition of a vehicle is accomplished the same way as illustrated in FIG. 4.

Figure 6:
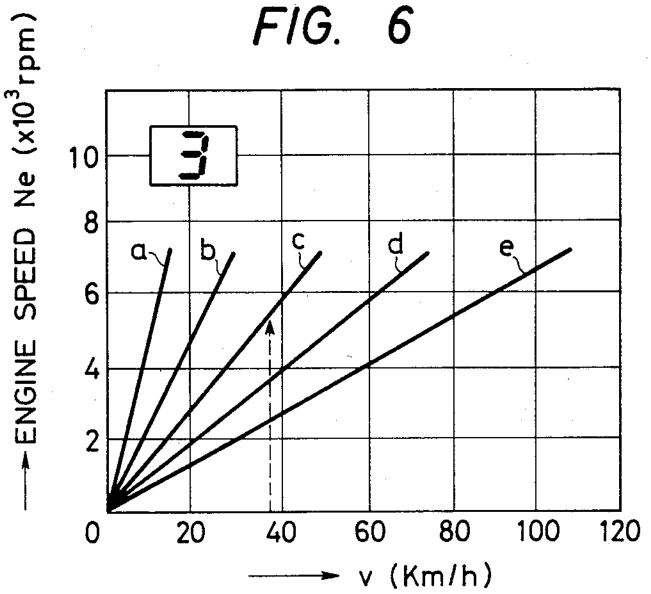

FIG. 6 is an illustration showing the display surface of display device in the case where this invention is applied to the display of the vehicle speed engine speed v. characteristics using the transmission gear as a parameter.

The characteristic curves a through e on the display surface indicate the speed v. engine speed characteristics for the first to the fifth transmission gear, respectively. In this case, the values of engine speed determined by speed and transmission gear may be stored previously in ROM 11, or the values of engine speed may be obtained by calculating for each transmission gear from the values of speed which are detected.

Figure 7:
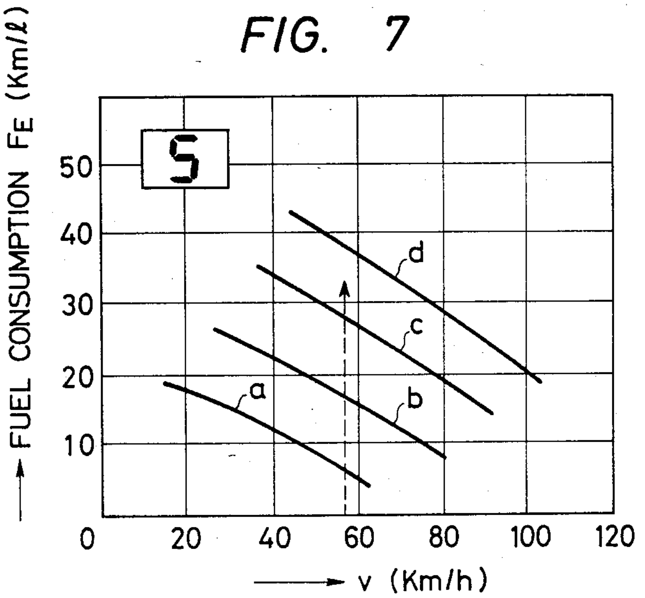

FIG. 7 is an illustration showing the display surface of a display device in the case where this invention is applied to the display of the speed-rate of fuel consumption characteristics using speed change gear as a parameter. Generally, the relationship between the rate of fuel consumption Fe and speed V is $Fe=V/Fc=f(Ne, \theta th)$: fuel consumption per unit time, and V: speed.

The values of Fc determined by engine speed and throttle opening are previously stored in the ROM 11, and the values of Fc are read out from the ROM by the address signals of engine speed and throttle opening, respectively. Speed signals V from the speed sensor are divided by the values of Fc using a divider to obtain the rate of fuel consumption signals. A display as shown with the arrow may be made by inputting the rate of fuel consumption signals and the speed signals, respectively, to the display device. The characteristic curves a through d drawn on the display surface indicate the rate of fuel consumption in normal running on a flat road for second-gear, third-gear, fourth-gear, or fifth-gear, respectively.

The input for fuel consumption signals may be obtained from a fuel gauge, etc. in actual running instead of ROM 11. The figures shown in the upper left frame in FIGS. 2, 4, 6, and 7 indicate the transmission gear being used. Although, in the aforementioned embodiments, a liquid crystal display is used as the display device, light sources such as a light emitting diodes may be arranged in the shape of a matrix. This display may be accomplished using well known sensors to detect the transmission gear and form an input to a conventional display grid.

Furthermore, it is convenient to obtain a wide range of information for the conditions of a vehicle such that the displays shown in the aforementioned embodiments are adapted to be switched to each other when desired.

As described above, in the devices according to this invention, two vehicle signals are used as inputs on orthogonal axes of a display surface and a position designated by the two vehicle signals is displayed on the display surface to find a specific condition of the vehicle. Hence, the system according to this invention is capable of achieving more complicated displays to obtain more comprehensive information about a vehicle's condition in comparison with the conventional devices.

It is apparent that modifications of this device may be practiced without departing from the essential scope thereof.

What is claimed is:

1. A display system for a motor vehicle comprising: first and second sensor means for sensing diverse vehicle operating parameters, said first sensor means generating a first input signal indicative of vehicle engine speed and said second sensor means generating a second input signal and comprising a sensor for sensing a throttle opening position; means receiving said first and second input signal for providing a first display signal indicative of vehicle engine speed and a second display signal indicative of vehicle engine power;

vehicle display means comprising; a plurality of display segments arranged in a matrix, a row of electrode strips arranged along an abscissa, being controllable with said first display signal and a row of electrode strips arranged along an ordinate being controllable with said second display signal, whereby at the crossing portions of the rows of electrode strips activated by the display signals a display segment is illustrated; and a memory storing an appropriate value for the vehicle engine power, wherein a value is read out from said memory in accordance with said first and second input signals for the engine speed and throttle opening, and this value is fed to said display means as a second display signal, and a curve image overlay on said display means indicative of characteristic curves showing the maximum power with respect to the actual engine speed for predetermined positions of the throttle.

2. The display system of claim 1 further comprising means to display the vehicle gear in use during display of said first and second display signals.

3. The display system of claim 1, wherein said means receiving said first and second input signals comprises; interface means receiving said first and second sensor signals, computer means for processing output signals from said interface means and generating signals provided to a decoder means for forming said first and second display signals.

4. The display system of claims 1 or 3, wherein said vehicle display means comprises a liquid crystal display having a first series of electrode strips receiving said first display signal, a second series of electrode strips receiving said second display signal and a linear series of display electrodes for displaying a vehicle condition responsive to an output from said processing means.

* * * * *